United States Patent [19]

Hara et al.

[11] Patent Number: 5,018,595
[45] Date of Patent: May 28, 1991

[54] TRACTION CONTROL SYSTEM

[75] Inventors: Mitsuo Hara, Bisai; Shigeru Kamio, Nagoya; Mitsunori Takao, Kariya; Katsuya Sakita, Obu, all of Japan; Tomoaki Abe, Brussels, Belgium

[73] Assignee: Nippondenso Co., Ltd., Kariya, Japan

[21] Appl. No.: 545,946

[22] Filed: Jun. 2, 1990

[30] Foreign Application Priority Data

Jul. 11, 1989 [JP] Japan ............................. 1-178442
May 24, 1990 [JP] Japan ............................. 2-134749

[51] Int. Cl.⁵ .................................... B60K 28/16
[52] U.S. Cl. ......................... 180/197; 364/426.01; 123/332
[58] Field of Search ................ 180/197, 76; 123/198 DB, 332, 333; 364/426.01, 426.03

[56] References Cited

U.S. PATENT DOCUMENTS

| | | |
|---|---|---|
| 4,773,517 | 9/1988 | Watanabe ............... 180/197 |
| 4,779,696 | 10/1988 | Harada et al. ........... 180/197 |
| 4,811,808 | 3/1989 | Matsumoto et al. ....... 180/197 |
| 4,850,446 | 7/1989 | Leiber et al. ........... 180/197 |
| 4,953,654 | 9/1990 | Imaseki et al. .......... 180/197 |

FOREIGN PATENT DOCUMENTS 60-183214 9/1985 Japan .
60-116035 6/1986 Japan .
61-135945 6/1986 Japan .
63-29031 2/1988 Japan .................... 180/197

Primary Examiner—Charles A. Marmor
Assistant Examiner—Alan M. Kagen
Attorney, Agent, or Firm—Cushman, Darby & Cushman

[57] ABSTRACT

A traction control system controls the engine torque so as to prevent wheel slip during acceleration. The system has an electric control unit ECU which detects the state of wheel slip on the basis of the deviation of the drive wheel speed from a target drive wheel speed computed in accordance with signals from various sensors such as drive wheel speed sensors, trailing wheel speed sensors, shift position sensor for sensing the shift position in an electronic control transmission ECT, engine speed sensor and accelerator sensor for sensing the amount of operation of accelerator. The ECU computes, in accordance with the state of the slip, a limit drive torque which does not allow surplus wheel slip during acceleration. The ECU also updates the limit drive torque depending on whether the surplus slip takes place on drive wheels, and detects also the amount of operation of the accelerator so as to inhibit updating of the limit drive torque when the detected amount of operation of accelerator is below a value corresponding to a limit throttle opening, whereby the engine is controlled such that the drive torque applied to the drive wheels is maintained below the limit drive torque.

17 Claims, 8 Drawing Sheets

TRACTION CONTROL SYSTEM

BACKGROUND OF THE INVENTION

1. Field of the Invention

The present invention relates to a traction control system for controlling drive torque of an automotive engine so as to prevent wheel slip of an automobile during acceleration.

2. Description of Prior Art

A traction control system has been known in which the drive torque is controlled to be suppressed in response to detection of wheel slip during acceleration of a motor vehicle. This known system, however, cannot completely eliminate the wheel slip because the control is commenced after detection of the wheel slip.

In order to overcome this problem, a traction control system capable of preventing wheel slip when starting or accelerating a motor vehicle has been proposed in, for example, Japanese Unexamined Patent Publication No. 61-135945. This system detects the state of the road surface and sets a limit drive torque in accordance with the detected state of the road surface, the limit drive torque being the threshold drive torque above which a wheel slip will occur during acceleration. The drive torque acting on the wheel is sensed by a torque sensor and the engine is controlled to maintain the detected drive torque below the limit drive torque, thereby preventing occurrence of the wheel slip during start and acceleration.

This known system also suffers from a problem in that the traction control cannot be performed with high accuracy due to the fact that the drive torque is controlled to a level higher or lower than the command torque or target torque due to inferior accuracy of the torque sensor which detects the drive torque.

In this known system, one of a plurality of previously registered values is set as the limit drive torque in response to, for example, a wiper drive signal or a signal from a switch manipulated by the driver. Actually, however, the limit drive torque should vary according to delicate change in the state of the road surface. Thus, the conventional system cannot optimumly adapt the limit drive torque to a change in the condition of the road surface. In addition, as stated above, the actual drive torque cannot be precisely detected due to inferior accuracy of the torque.

Consequently, the known traction control system often occurs a wheel slip during acceleration due to surplus drive torque or reduces the acceleration due to insufficient drive torque.

SUMMARY OF THE INVENTION

Accordingly, the present invention is made in consideration of the above-mentioned problems of the prior art. It is an object of the present invention to provide a traction control system capable of preventing wheel slip at high accuracy.

To this end, according to the present invention as shown in FIG. 1, there is provided a traction control system comprising: slip state detecting means for detecting the state of a wheel of a vehicle; limit drive torque updating means for successively changing the limit drive torque in accordance with the state of the while slip; limit throttle opening setting means for setting a limit of amount of the throttle in accordance with the updated limit drive torque; accelerator operation amount detection means for detecting the amount of operation of the accelerator by the driver; inhibiting means for inhibiting updating of the limit drive torque when the amount of operation of the accelerator is smaller than the limit throttle operation amount; and engine control means for controlling the engine such that the actual driving torque is maintained below the limit drive torque.

Preferably, the slip state detecting means includes: drive wheel speed detecting means for detecting the speed of a drive wheel of the vehicle; and trailing wheel speed detecting means for detecting the speed of a trailing wheel of the motor vehicle.

Preferably, the slip state detecting means further includes a target drive wheel speed setting means for setting a target speed of the drive wheel in accordance with the speed of the trailing wheel. This target drive wheel speed setting means includes first target drive wheel speed setting means which sets the target speed on the basis of the speed of the trailing wheel and a predetermined slip rate. Further, the target drive wheel speed setting means has second target drive wheel speed setting means which sets a value obtained by adding a predetermined value to the trailing wheel speed as the target drive wheel target speed.

Preferably, the slip state detecting means includes decision means which decides that a slip of the drive wheel is taking place when the target drive wheel speed is exceeded by the detected drive wheel speed, and that no slip of the drive wheel is taking place when the detected drive wheel speed is below the target drive wheel speed. The limit drive torque updating means preferably includes first target drive torque setting means for setting said limit drive torque such that the limit drive torque is decreased when a slip is taking place in the vehicle and the limit drive torque is increased when no slip is taking place therein. Further, the limit drive torque updating means includes second target drive torque setting means capable of setting the limit drive torque in accordance with the deviation of the detected drive wheel speed from the target drive wheel speed.

Preferably, the limit throttle operation amount setting means includes: engine speed detecting means for detecting the speed of engine; transmission ratio detecting means for detecting the transmission ratio of the vehicle; and conversion means for converting the limit drive torque into the limit throttle operation amount in accordance with the engine speed and the transmission ratio. The conversion means preferably includes limit engine torque setting means for setting a limit of the engine torque in accordance with the limit drive torque and the transmission ratio, and limit throttle operation amount setting means for setting the limit throttle operation amount in accordance with the engine speed and the limit engine torque.

Preferably, the limit drive torque updating means includes initial value setting means capable of storing the limit drive torque even after turning off of the engine and setting the stored limit drive torque as the initial value when the traction control is commenced again. The limit drive torque updating means preferably includes running state detecting means for detecting the running state of the vehicle and limit drive torque resetting means for resetting the limit drive torque to a previously stored value when the running state detection means has detected that the vehicle is not running. Preferably, the limit drive torque resetting means includes memory means which stores, as the previously stored value, a limit drive torque assuming a compacted snowy road having a friction coefficient of 0.3 to 0.4.

Preferably, the traction control system further comprises an actuator for actuating the throttle valve of the engine. In this case, the engine control means preferably includes target throttle operation amount setting means for setting, as the target throttle operation amount, the smaller one of the limit throttle operation amount and the accelerator operation amount, and throttle operation amount control means for controlling the actuator such that the actual operation amount of the throttle valve coincides with the target throttle opening.

Preferably, the accelerator operation amount detecting means includes accelerator operation amount conversion means for converting the accelerator operation amount into a value corresponding to the throttle valve operation amount.

In another preferred form, the traction control system of the present invention comprises: slip state detecting means for detecting the state of wheel slip of a vehicle; limit drive torque updating means for successively updating the limit drive torque in accordance with the detected state of the slip; limit throttle valve operation amount setting means for setting the limit of amount of operation of the throttle valve in accordance with the limit drive torque; instruction value detecting means for detecting the instruction value of operation amount of the throttle valve corresponding to the amount of operation of the accelerator by the driver; inhibiting means for preventing updating of the limit drive torque when the instruction value is smaller than the limit value; and engine control means for controlling the engine such that the drive torque of the vehicle is below the limit drive torque.

In operation, the limit drive torque updating means updates the limit drive torque in accordance with the state of the slip detected by the slip state detecting means, and the limit throttle operation amount setting means sets a limit throttle operation amount corresponding to the updated limit drive torque. When the amount of operation of the accelerator detected by the accelerator operation amount detecting means is smaller than the limit throttle operation amount, i.e., when the vehicle is running in accordance with the will of the driver so that the driver is satisfied with the instant drive torque, the inhibiting means inhibits updating of the limit drive torque. Consequently, the engine is controlled such that the drive torque of the vehicle is maintained below the limit drive torque.

DESCRIPTION OF THE PREFERRED EMBODIMENTS

An embodiment of the present invention applied to a motor vehicle having an automatic transmission will be described with reference to the drawings.

Figure 1:
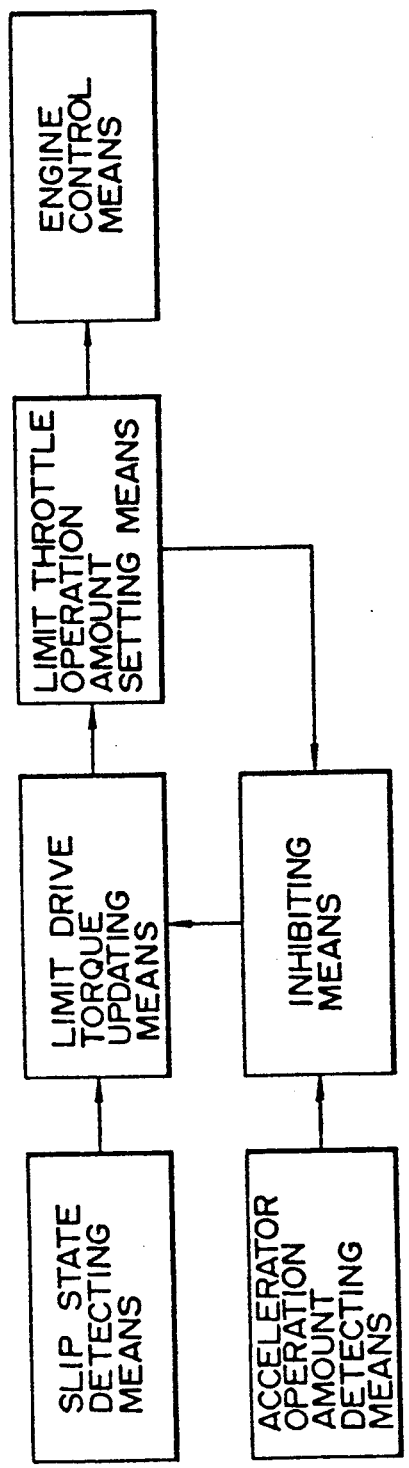
FIG. 1 is a block diagram showing the basic construction of the traction control system of the present invention.
Figure 2:
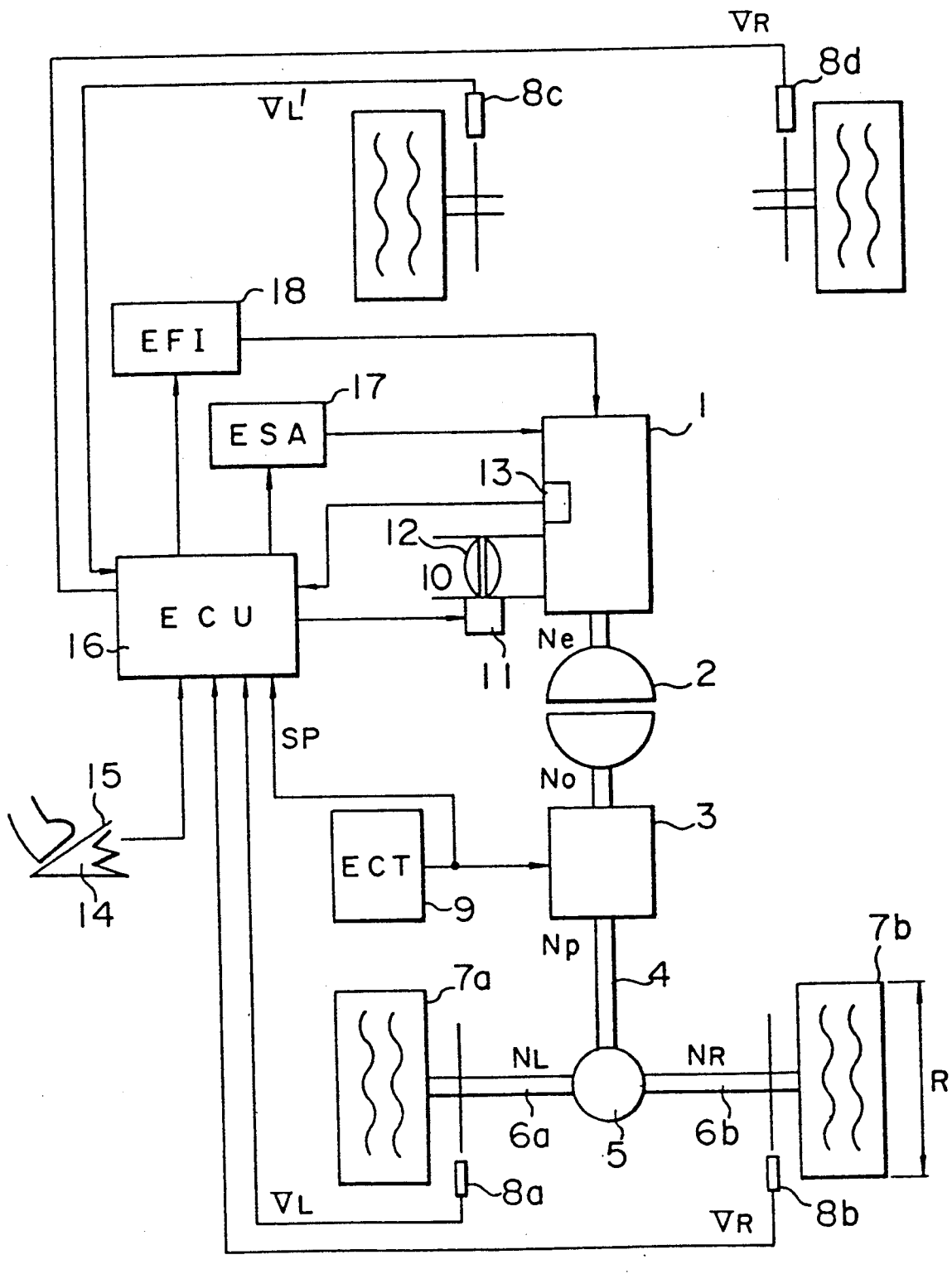
FIG. 2 is an illustration of an embodiment of the present invention applied to a motor vehicle having an automatic transmission.

Referring to FIG. 2 showing the construction of a first embodiment, an engine torque ET from an engine 1 of a motor vehicle is converted into drive torque DT and transmitted to drive wheels 7a, 7b of the vehicle through a torque converter 2, electronic control transmission 3, a propeller shaft 4, a differential gear and axle shafts 6a, 6b. Drive wheel speed sensors 8a and 8b are capable of detecting the drive wheel speeds $V_L$ and $V_R$, i.e., speeds of the drive wheels 7a, 7b, while trailing wheel speed sensors 8c and 8d are capable of detecting the trailing wheel speeds $V_L'$ and $V_R'$, i.e., speeds of the trailing wheels 7c, 7d.

The electronic control transmission 3 is controlled to select a predetermined speed gear in accordance with a shift position signal SP from an electronic control transmission control device (ECT) 9. Air is induced into the engine 1 through an intake pipe 10. The rate of supply of the intake air is controlled by a throttle valve 12 which is under the control of an actuator 11. The engine speed Ne (rotation speed of engine crankshaft) is detected by an engine speed sensor 13. The amount AA of stepping down of an accelerator pedal 15 (referred to as "accelerator opening" hereinafter) serving as an accelerator operation amount is detected by an accelerator sensor 14. The accelerator opening includes the angle of operation of the accelerator.

Figure 3:
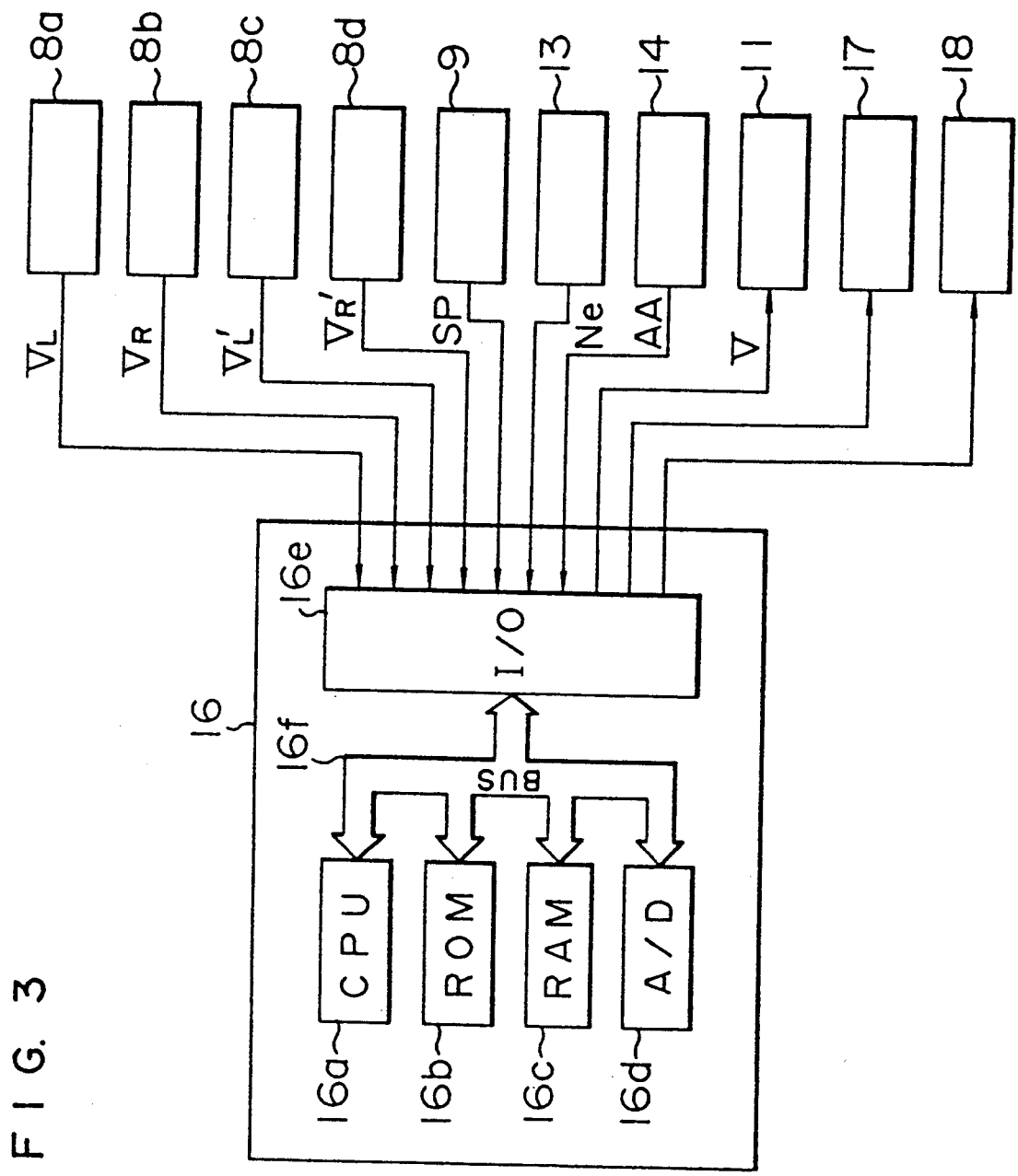
FIG. 3 is a diagram of an electronic control device used in the embodiment shown in FIG. 2.

The traction control is conducted under the control of an electronic control unit (ECU) which, upon receipt of signals form the sensors mentioned above, computes the amount TA of control of the throttle valve 12 and delivers a control signal V corresponding to the throttle control amount TA to the actuator 11. As will be seen from FIG. 3, the ECU 16 has a central processing unit (CPU) 16a as computing means, read only memory (ROM) 16b as the memory means and a random access memory (RAM) 16c which also serves as memory means.

The RAM 16c includes a backup RAM 16c' which stores the content of the memory even after the ignition circuit is opened. The ECU 16 further includes an analog-to-digital converter (A/D) 16d, input/output port (I/O) 16e for receiving the signals from the sensors and for delivering the control signal V, and a BUS 16f through which the ECU 16 is connected to the sensors and the actuator.

An ignition timing controller (ESA) 17 controls the ignition timing in accordance with the state of the engine operation. A fuel injection controller (EFI) 18 operates to control the supply of the fuel in accordance with the state of engine operation.

A description will be given of the traction control executed under the control of the CPU 16a, with reference to a flow chart shown in FIG. 4.

In Step 100, the CPU 16a reads signals from the sensors: namely, left and right drive wheel speeds $V_L$, $V_R$, left and right trailing wheel speeds $V_L'$, $V_R'$, shift position signal SP, engine speed Ne, accelerator opening AA, etc.

Steps 101 to 103 function as detecting means and are for detecting the state of the slip of drive wheels in the motor vehicle on the basis of the deviation $V_e$ of the drive wheel speed Vd and the target drive wheel speed Vt. More specifically, Step 101 computes the drive wheel speed Vd and the vehicle speed Vo. Although not exclusive, in this embodiment, the greater one of the left and right drive wheel speeds $V_L$, $V_R$ is set as the drive Wheel speed Vd, while the greater one of the left and right trailing wheel speeds $V_L'$, $V_R'$ is set as the vehicle velocity Vo. The subsequent step 102 sets the target drive wheel speed Vt. The target drive wheel speed Vt is the speed of the drive wheel which enables the motor vehicle to run or start smoothly with a predetermined optimum slip ratio S, i.e., without any surplus slip. The predetermined slip ratio S is, in this embodiment, 0.02 (2%). The target drive wheel speed Vt is set in accordance with the vehicle speed Vo. In general, the slip ratio S is defined as follows on the basis of the drive wheel speed Vd and the vehicle speed Vo.

$$S=(Vd-Vo)/Vd$$

The following condition is established by substituting the target drive wheel speed Vt to the formula shown above.

$$S=(Vt-Vo)/Vt$$

Therefore, the target drive wheel speed Vt is determined by the following formula.

$$Vt=Vo/(1-S)$$

Taking the acceleration characteristic into consideration, a guard processing is conducted for the lower limit value of the target drive wheel speed Vt. For instance, in this embodiment, when the target drive wheel speed Vt is lower than (Vo+1) kg/h, the target drive wheel speed Vt is set to (Vo+1) km/h.

The next step 103 computes the deviation Ve (=Vt−Vd) of the detected drive wheel speed Vd from the target drive wheel speed Vt. When the road surface is slippery, the deviation Ve is large even when the level of the drive torque DT is the same. This means that the state of the road surface can be predicted through the computation of the deviation Ve.

Steps 104 to 107 are for detecting the limit drive torque DTmax in accordance with the deviation Ve. The limit drive torque is the threshold value of the drive torque DT above which the drive wheels 7a, 7b will not slip during acceleration. More specifically, Step 104 detects the state of the drive wheels slip. Namely, the CPU decides that no slip is taking place on the drive wheels 7a, 7b when the deviation Ve is positive, i.e., there is no surplus slip mentioned before. Conversely, when the deviation Ve is negative, the CPU decides that slip is taking place on the drive wheels 7a, 7b, i.e., the aforementioned surplus slip exists. When the deviation Ve is found to be negative in Step 104, i.e., if the surplus slip is taking place, the process proceeds to Step 106 in which the limit drive torque DTmax is reduced by an amount corresponding to the deviation Ve as will be explained later. Conversely, when the decision in Step 104 has proved that the deviation Ve is positive, i.e., when there is no surplus step, it is possible at least to raise the drive torque DT. In this stage, however, whether the driver wishes to accelerate the vehicle is uncertain. Step 105 is provided to confirm the driver's will. Namely, when the accelerator opening AA is below the limit throttle opening TAmax referred hereinafter to as a limit throttle operation amount, the CPU decides that the vehicle is running in accordance with the driver's will, i.e., the driver is satisfied with the instant drive toque DT, and inhibits execution of updating of the limit drive torque DTmax which is to be executed in subsequent steps 106 to 109. Conversely, an accelerator opening AA greater than the limit throttle opening TAmax suggests that the engine torque ET is too restricted despite a driver's will to accelerate the vehicle. In this case, the process proceeds to Step 106 in which the limit drive torque DTmax is incremented by an amount corresponding to the deviation Ve.

The updating of the limit drive torque DTmax in Step 106 is executed in the following formula in this embodiment:

$$DTmax \rightarrow DTmax + K_L \times Ve$$

where, $K_L$ represents a constant.

The formula means that, when there is no surplus slip taking place on the drive wheels 7a, 7b (Ve >0) while the driver wishes to accelerate the vehicle, the limit drive torque DTmax is updated so as to be increased by an amount corresponding to the deviation Ve, whereas, when excessive slip is taking place on the drive wheels 7a, 7b (Ve→0), the limit drive torque DTmax is decreased by an amount corresponding to the deviation Ve, whereby the limit drive torque DTmax is updated as the learnt value.

In Step 107, a guard processing is conducted on the limit drive torque DTmax updated in Step 106. This guard processing is executed for the following purpose. Namely, since the limit drive torque DTmax is updated in accordance with the value of the deviation Ve, the limit drive torque DTmax may become too large to make the vehicle out of control when no surplus slip is taking place on the drive wheels 7a, 7b. The guard processing is conducted to eliminate such an occasion. The guard processing is to set the limit drive torque DTmax within a range which is determined by a predetermined upper limit and a predetermined lower limit. When the limit drive torque DTmax exceeds such an upper limit, the value of the limit drive torque TDmax is set to the level of the upper limit, whereas, when the limit drive torque DTmax is below the lower limit, it is set to the same level as this lower limit.

Step 110 functions as conversion means and is executed for converting the limit drive torque DTmax to a limit engine torque ETmax, in order to control the engine 1 such that the drive torque is maintained below the limit drive torque DTmax.

Figure 5:
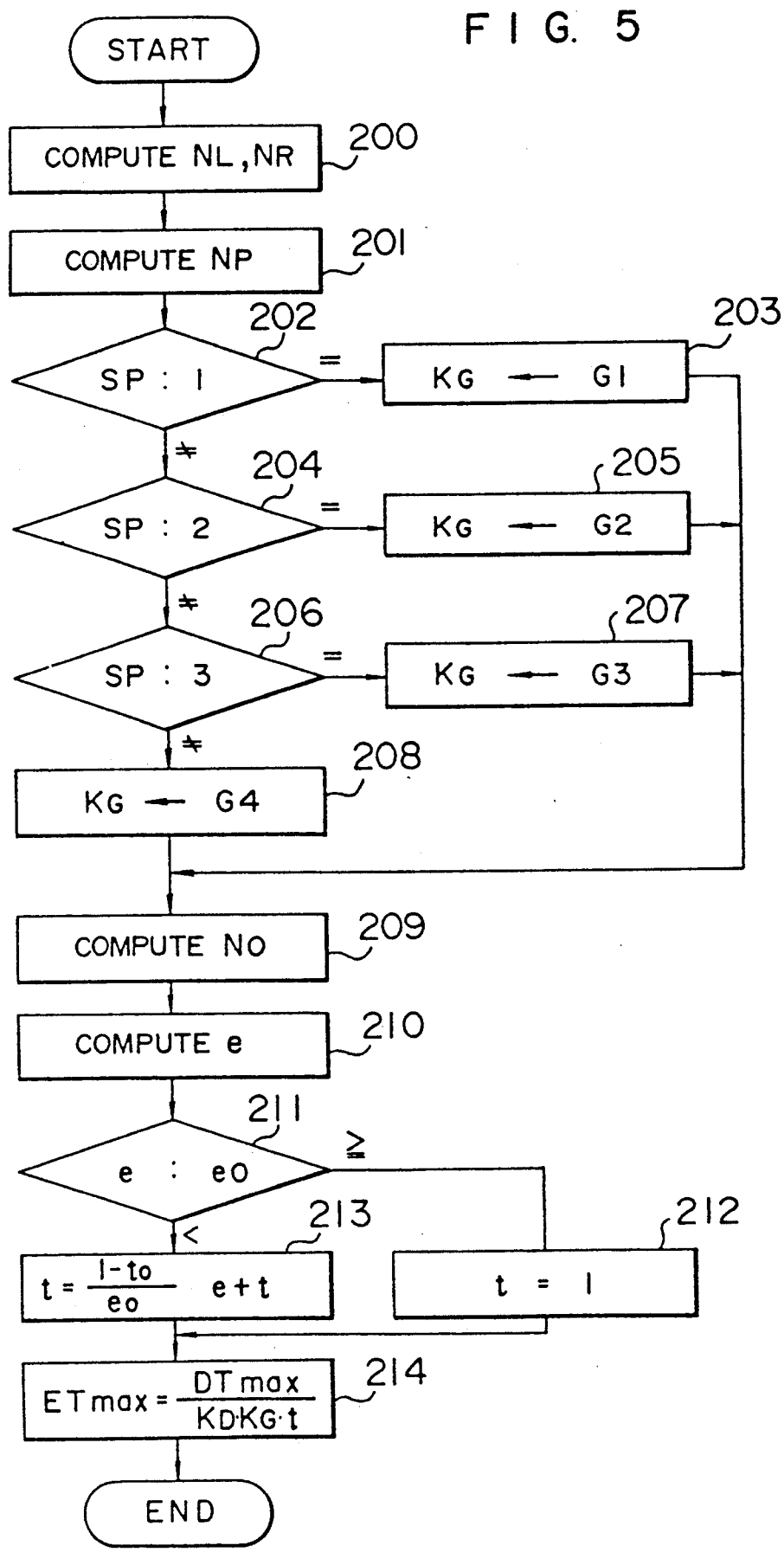

The processing performed in Step 110 will be described with reference to a flow chart shown in FIG. 5.

In Steps 200 to 209, the torque converter 2 output engine speed Ne is determined from the axle shaft speeds $N_L$ and $N_R$ of the left and right axle shafts 6a, 6b. In Step 200, the speed $N_L$ of the left axle shaft 6a and the speed $N_R$ of the right axle shaft 6b are computed in accordance with the following formulae:

$$N_L = V_L/\pi R$$

$$N_R = V_R/\pi R$$

Where, R represents the wheel diameter.

In Step 201, the speed $N_P$ of the propeller Shaft 4 is computed in accordance with the following formula:

$$N_P = K_D \times (N_L \times N_R)/2$$

where, $K_D$ represents the differential ratio.

Steps 202 to 208 are for setting a transmission ratio $K_G$ of the electronic control transmission 3 corresponding to the shift position signal SP from the ECT 9. More specifically, when the shift position signal SP is found to be 1 in Step 202, the process proceeds to Step 203 which sets the speed changing ratio $G_1$ of the first speed as the speed changing ratio $K_G$. When the shift position signal SP being 2 is confirmed in Step 204, the process proceeds to Step 205 which sets the transmission ratio $G_2$ of the second speed as the transmission ratio $K_G$. If the shift position signal SP being 3 is detected in Step 206, the transmission ratio $G_3$ of the third speed is set as the speed changing ratio $K_G$. When the shift position signal is not 1. 2 nor 3, the process proceeds to Step 208 which sets the transmission ratio $G_4$ of the fourth speed as the transmission ratio KG These transmission ratios are determined to meet the conditions of $G_1 < G_2 < G_3 < G_4$.

Step 209 determines the output rotation speed No of the torque converter 2. For instance, the torque converter 2 output rotation speed No is determined in accordance with the following formula from the transmission ratio $K_G$ and the propeller shaft rotation speed $N_P$ determined in Step 201

$$N_0 = K_G \times N_P$$

As will be seen from this formula, the greater the transmission ratio $K_G$ (when gear of higher speed is selected), the higher the propeller shaft speed $N_P$ with respect to the torque converter 2 output speed No.

Figure 6:
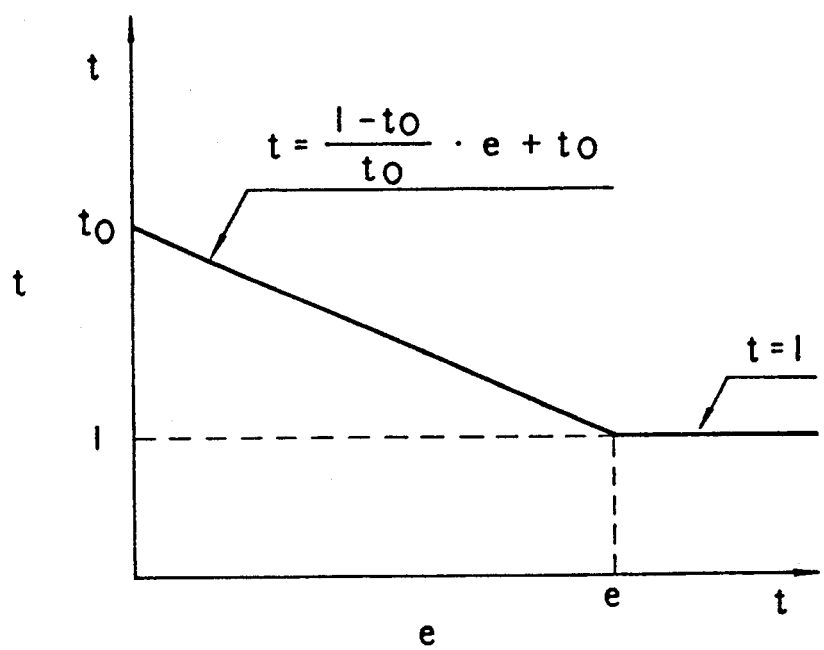
FIG. 6 is a graph showing the relationship between the torque converter speed ratio e and the torque converter torque ratio t.

Steps 210 to 213 are executed for determining the torque ratio t of the torque converter. A characteristic as shown in FIG. 6 exists between the torque converter torque ratio t and the torque converter speed ratio e. As will be seen from FIG. 6, the characteristic of the torque ratio t is changed as the speed ratio e is changed across a coupling speed ratio $e_0$ which is about 0.8. When the torque converter speed ratio e is small, the torque converter performs the torque converting function so that the torque ratio t is determined as follows in relation to the speed ratio e.

$$t = \{(1-t_0)/e_0\} \times e + t_0 \quad (1)$$

where $t_0$ represents the torque converter torque ratio t obtained when the torque converter speed ratio e is zero. The torque ratio $t_0$ generally ranges between 2.0 and 2.4.

When the torque converter speed ratio e is equal to or greater than the coupling speed ratio $e_0$, the torque converter serves as a torque coupler to provide a torque ratio which is equal to 1.

Taking into account the above-described characteristic of the torque converter 2, Step 210 determines the torque converter torque ratio e as follows.

$$e = N_P/N_0$$

Subsequently, whether the torque converter speed ratio e is higher than the coupling speed ratio $e_0$ is determined in Step 211. When the torque converter speed ratio e equals to or exceeds the coupling speed ratio $e_0$, the process proceeds to Step 212 in which the torque ratio t is set to 1. However, when the torque converter speed ratio e is below the coupling speed ratio $e_0$, the process proceeds to Step 213 in which the torque converter torque ratio t is determined by the aforementioned formula (1).

The process then proceeds to Step 214 in which the limit engine torque ETmax corresponding to the limit drive torque DTmax is determined.

In this state, the torque ratio in the electronic control transmission 3 is equal to the transmission ratio $K_G$, while the torque ratio in the differential gear 5 is equal to the differential ratio $K_D$ so that the limit engine torque ETmax corresponding to the limit drive torque DTmax is determined by the following formula.

$$ETmax = DTmax/(K_D \cdot K_G \cdot t)$$

Referring again to FIG. 4, Step 109 is executed in which the limit engine torque ETmax determined in Step 108 is stored in the backup RAM 16c'.

Figure 7:
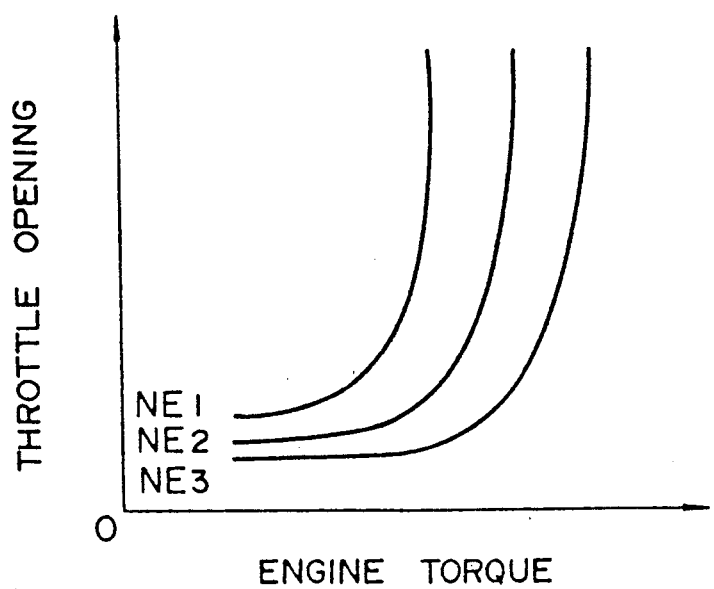
FIG. 7 is a graph showing the relationship in characteristic between the throttle opening AA and the engine torque ET at an engine speed Ne.

Steps 110 to 114 function as control means and are for setting the target opening TA of the throttle valve 12 (target throttle opening) serving as the target throttle operation amount so as to control the engine such that the drive torque applied to the drive wheels is maintained below the limit drive torque DTmax. In Step 110, the limit throttle opening TAmax serving as the limit throttle operation amount is set on the basis of the limit engine torque ETmax and the engine speed Ne. Although not exclusive, the setting of the limit throttle opening TAmax is conducted in this embodiment by storing, in the ROM 16b, a look-up table which contains values of the limit throttle opening TAmax in relation to the limit engine torque ETmax and the speed Ne as shown in FIG. 7, and successively reading the value of the limit throttle opening TAmax from the table in accordance with the limit engine torque ETmax and the rotation speed Ne.

Step 111 compares the limit throttle opening TAmax set in Step 110 with the accelerator opening AA. When the accelerator opening AA is greater than the limit throttle opening TAmax, the target throttle opening TA is set to the level of the limit throttle opening TAmax in Step 112. Conversely, when in Step 111 the accelerator opening AA is smaller than the limit throttle opening TAmax, Step 113 is executed to set the target throttle opening TA to the level of the accelerator opening AA.

In Step 114, the control signal V corresponding to the target throttle opening TA set in Step 112 or 113 is delivered to the actuator 11 so that the throttle valve 12 it controlled to the target throttle opening TA.

Figure 8:
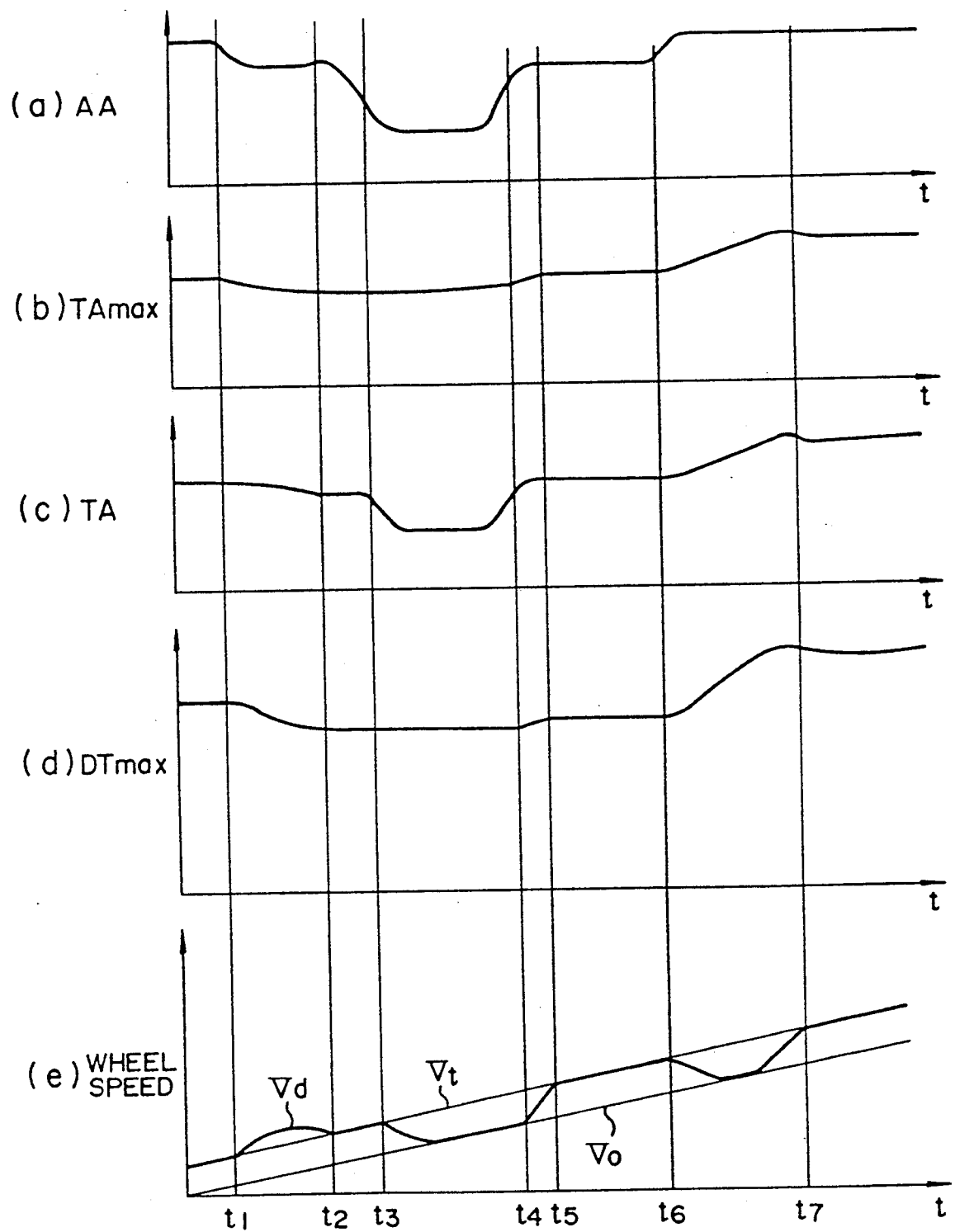
FIG. 8 is a time chart illustrative of the operation of the embodiment shown in FIG. 2.

FIG. 8 is a time chart showing the operation of described embodiment.

When the drive wheel speed Vd is greater than the target drive wheel speed Vt, i.e., in the period between instants t1 and t2 in FIG. 8(d), the deviation Ve is negative so that the limit drive torque DTmax (see FIG. 8(d)) is decreased by an amount corresponding to the deviation Ve. Conversely, when the drive wheel speed Vd is smaller than the target drive wheel speed Vt, i.e., when the deviation Ve is positive, while the accelerator opening AA is greater than the limit throttle opening TAmax (period between instants t4 and t5 and between t6 and t7 in FIG. 8(d)), the limit drive torque DTmax is increased by an amount corresponding to the deviation Ve. When the drive wheel speed Vd is equal to the target drive wheel speed Vt (periods between instants t2 and t3 and between t5 and t6 in FIG. 8(d)), i.e., when the deviation Ve is zero, or, alternatively, when the drive wheel speed Vd is smaller than the target drive wheel speed Vt, i.e., the deviation Ve is positive, while the accelerator opening AA is smaller than the limit throttle opening TAmax (period between instants t3 and t4 in FIG. 8(d)), the updating of the limit drive torque DTmax is inhibited so that the most current limit drive torque DGTmax obtained by the last updating operation is held.

The condition of the road surface is changed at an instant t6 so as to increase the friction coefficient so that the limit drive torque DTmax is increased in the period between instants t6 and t7.

The throttle opening AA is controlled in accordance with the updated or the last limit drive torque DTmax so that the drive wheel speed Vd is controlled to conform with the target drive wheel speed Vt. The limit drive torque DTmax obtained in this state is the limit drive torque DTmax which enables the vehicle to run with the optimum slip ratio S under the instant road surface condition. Therefore, even when the engine 1 is operated to quickly accelerate the vehicle, the actual drive torque DT transmitted to the drive wheels 7a, 7b is maintained at the level of the limit drive torque DTmax so that the motor vehicle 1 can be accelerated without any surplus slip of the drive wheels 7a, 7b. Furthermore, the limit engine torque ETmax corresponding to the limit drive torque DTmax is stored as a learnt value in the backup RAM 16c'. Therefore, when the motor vehicle 1 is restarted after turning off of the engine 1, the limit engine torque ETmax, which has been updated in accordance with the condition of the road surface where the vehicle has been parked, is read out from the backup RAM 16c' and the engine is controlled such that the engine torque ET does not exceed this limit engine torque ETmax, whereby the vehicle can start and be accelerated without slip. Thus, the traction control system of this embodiment provides a greater precision of the control which is much superior to the known control system which commences the control after detection of occurrence of a slip.

In the described embodiment, the throttle valve 12 is controlled so as not to exceed the limit throttle opening TAmax which is determined in accordance with the limit drive torque DTmax which in turn is determined by the process explained hereinbefore. Thus, the engine power is controlled such that the drive torque DT actually applied to the drive wheels 7a, 7b does not exceed the limit drive torque DTmax. Thus, the engine is controlled in accordance with the limit drive torque without relying upon any inaccurate, whereby the precision of the control is enhanced.

The drive wheel speed sensors 8a, 8b and the trailing wheel speed sensors 8c, 8d can be used also as sensors for a skid control system which prevents lock of wheels, thus contributing to a reduction in the cost.

In the embodiment described hereinbefore, the updated limit drive torque DTmax is stored in the backup RAM 16c' and, when the motor vehicle is restarted, the engine 1 is controlled such that the drive torque does not exceed this stored limit drive torque DTmax which is updated and learnt therein. This, however, is not exclusive and the arrangement may be such that, when the vehicle is restarted, a value DT0 which is beforehand set in ROM 16b is used as the limit drive torque DTmax for enabling the motor vehicle to start without slip, as in the case of a second embodiment which will be described with reference to FIG. 9.

Figure 9:
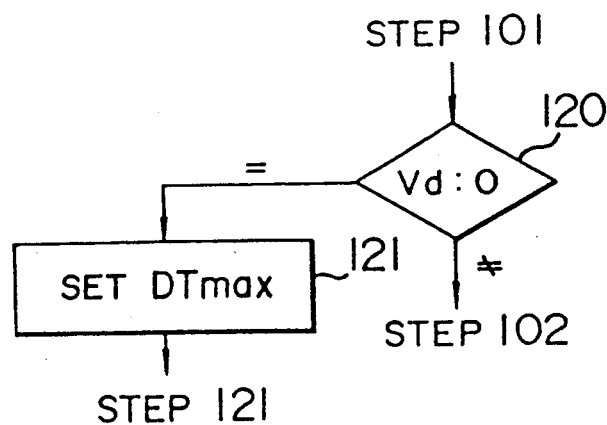
FIG. 9 is a flow chart illustrative of the operation of another embodiment.

FIG. 9 is a flow chart showing the operation of the second embodiment. As in the case of the first embodiment, the drive wheel speed Vd and the motor vehicle speed $V_0$ are determined in Step 101. The process proceeds to Step 120 which detects the state of the drive wheel 7a, 7b from the drive wheel speed Vd. When the drive wheel speed Vd is not zero, i.e., when the vehicle is running, the process proceeds to Step 102 so that Steps 102 onwards shown in FIG. 4 are executed. When the drive wheel speed Vd is zero, i.e., when the vehicle is not running, the process proceeds to Step 121 in which a predetermined value DT0 is set as the limit drive torque DTmax. The process then proceeds to Step 108 so that Steps 108 onwards of the routine shown in FIG. 4 are executed.

In this embodiment, the predetermined value DT0 of the initial limit drive torque is determined in the following manner.

For instance, the value DT0 is determined to be the limit drive torque DTmax which enables the vehicle to start on a compacted snowy ascending road (road surface friction coefficient $\mu = 0.3$ to 0.4) of a gradient not greater than 10%. To enable the vehicle to start at an ascending slope of an angle $\theta$, it is necessary that the drive torque DT meets the following condition:

$$W \cdot \sin\theta < DT < (\mu/2) \cdot W \cdot \cos\theta$$

where, W represents the weight of the vehicle. When the gradient is 10% less, the value of the angle $\theta$ is so small that the values of $\sin\theta$ and $\cos\theta$ can be approximated by $\theta$ and 1, respectively, and the road surface friction coefficient is $\mu = 0.3$ to 0.4.

Therefore, the condition mentioned above can be rewritten as follows.

$$0.1 W < DT < 0.15 W$$

Therefore, when a value which is 10 to 15% the weight W of the vehicle is set as the value DT0, the vehicle can smoothly start on the snowy ascending road of a gradient not greater than 10%.

Thus, by using a previously set small value TD0 as the initial value of the limit drive torque DTmax to be used when the vehicle is stated, the motor vehicle can smoothly start without surplus wheel slip even when the road condition has been changed during parking.

Figure 4:
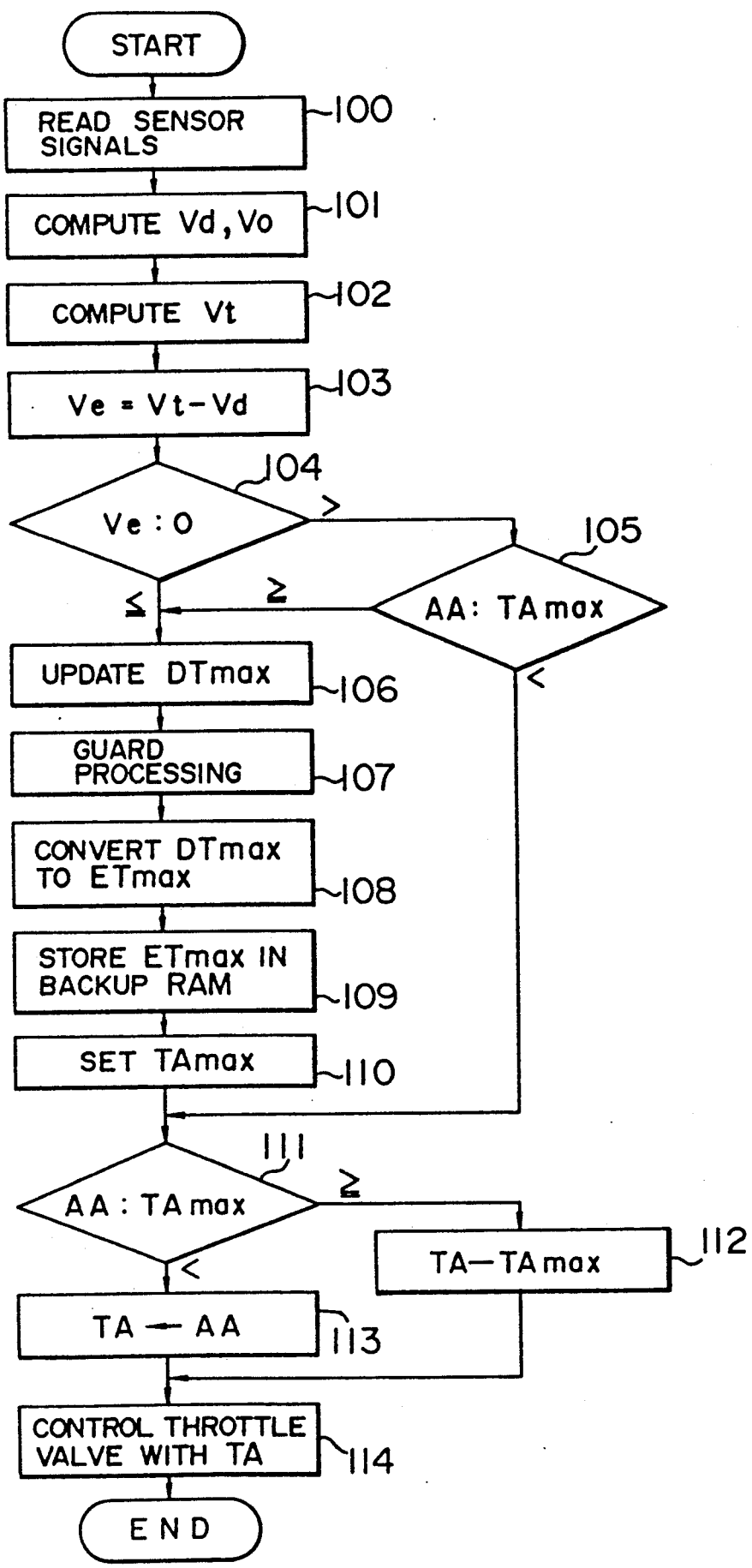
FIGS. 4 and 5 are flow charts illustrative of the operation of the embodiment shown in FIG. 2.

In the described embodiment, the determination of the drive wheel speed Vd conducted in Step 101 of the routine shown in FIG. 4 is to set the grater one of the left and right drive wheel speeds $V_L$ and $V_R$ as the drive wheel speed Vd. This, however, is not exclusive and the arrangement may be such that the mean value of the left and right drive wheel speeds $V_L$ and $V_R$ is used as the mean drive wheel speed Vd.

Figure 10:
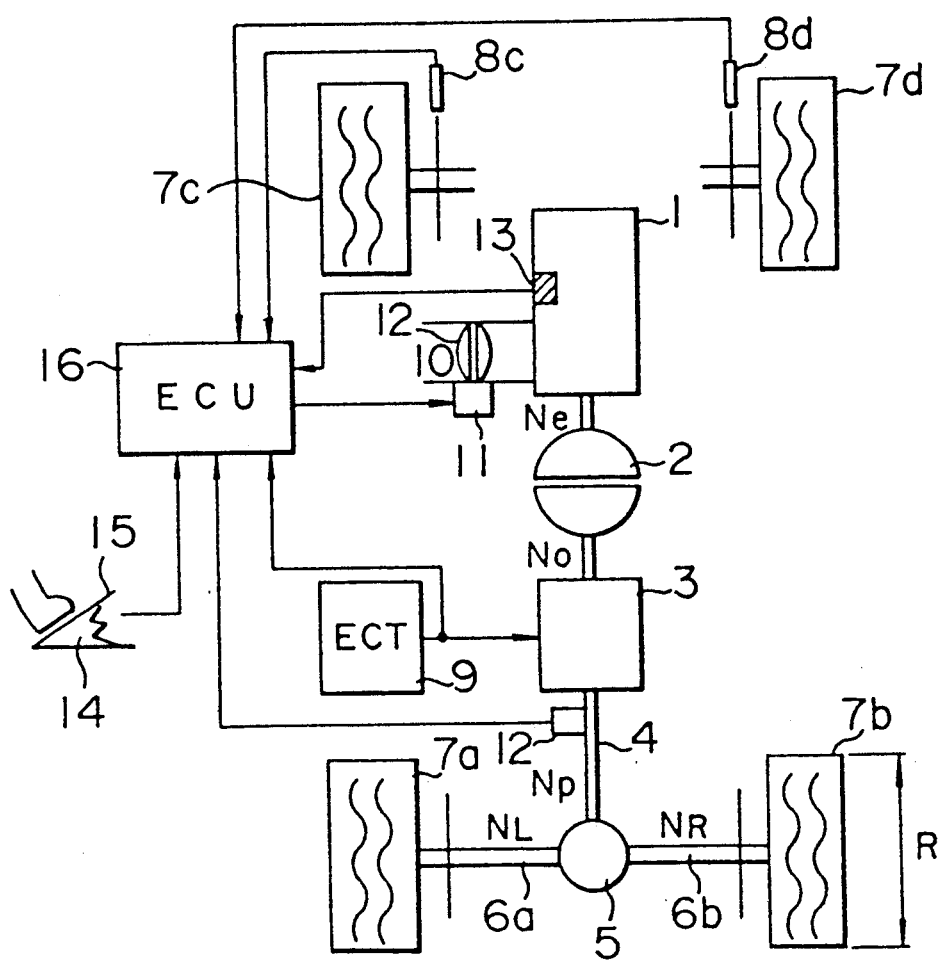
FIG. 10 is an illustration of the basic construction of the embodiment which operates in accordance with the flow shown in FIG. 9.

FIG. 10 shows a different embodiment in which a propeller shaft speed sensor 12 is used in place of the drive wheel speed sensors 8a, 8b, so that the drive wheel speed Vd is determined on the basis of the detected propeler shaft speed $N_P$. In this case, the control flow is modified such that Steps 200 and 201 are omitted and the differential ratio $K_D$ is set to 1 in the flow chart shown in FIG. 6.

Although in the described embodiments the limit engine torque ETmax is stored in the backup RAM 16c' as the learnt value, the system may be modified such that the limit drive torque DTmax is stored as the learnt value in place of the limit engine torque ETmax.

In the case where the transmission is of the type which linearly changes the speed changing ratio $K_G$, a computation formula concerning the transmission ratio $K_G$ or a characteristic table concerning the transmission ratio $K_G$ is stored in the ROM 16b.

In the described embodiments, the setting of the target drive wheel speed Vt is conducted on the basis of the motor vehicle speed $V_0$ which is determined by the left and right trailing wheel speed $V_L'$ and $V_R'$ and the slip ratio S in accordance with the formula of $Vt = V_0/(1-S)$. This, however, is only illustrative and the target drive wheel speed Vt may be determined in accordance with a formula of $Vt = V_0 \times (1+S)$. It is also possible to use, as the target drive wheel speed Vt, a value which is obtained by adding a suitable value (target slip speed Vs, e.g., 1 to 2 km/h) to the instant vehicle speed $V_0$.

In the described embodiments, the control of the engine torque ET is effected by controlling the throttle valve 12 in conformity with the limit throttle opening which is determined in accordance with the limit engine torque. The invention, however, may be modified such that a target air-fuel ratio is set in accordance with the limit engine torque ETmax, and the rate of supply of the fuel to the engine 1 is controlled to realize the target air-fuel ratio, thereby controlling the engine torque ET. It is also possible to control the engine torque ET by varying the ignition timing in accordance with the limit engine torque ETmax.

As has been described, according to the present invention, the limit drive torque DTmax setting means sets the limit value of the drive torque DT in accordance with the detected sate of wheel slip, so as to enable the motor vehicle to start and run with a desired state of wheel slip. When the operation amount of the accelerator is smaller than the value corresponding to the throttle operation amount which is determined by the limit drive torque DTmax, i.e., when the motor vehicle is running strictly in accordance with the driver's will so that the driver is satisfied with the present drive torque DT, the inhibiting means inhibits updating of the limit drive torque which DTmax is to be performed by the limit drive torque DTmax updating means.

Consequently, the engine is controlled such that the drive torque applied to the drive wheels does not exceed the limit drive torque which is updated in accordance with the state of the road surface on which the motor vehicle is running.

As has been described, the present invention provides an improvement in the accuracy of traction control and enables the engine 1 to be controlled in accordance with updated limit drive torque DTmax. The updated limit drive torque DTmax based on the condition of road surface can be stored and held even after turning off of the engine 1 so as to be used as the initial limit drive torque for the traction control when the motor vehicle is restarted, thus enabling the motor vehicle to start up without surplus slip and in the high accuracy.

What is claimed is:

1. A traction control system comprising:
   slip state detecting means for detecting the state of a wheel of a motor vehicle;
   limit drive torque updating means for successively changing the limit drive torque in accordance with the state of the slip;
   limit throttle operation amount setting means for setting a limit of amount of operation of the throttle valve in accordance with the updated limit drive torque;
   accelerator operation amount detecting means for detecting the amount of operation of the accelerator by the driver;
   inhibiting means for inhibiting updating of said limit drive torque when the amount of operation of the accelerator is smaller than said limit throttle operation amount; and
   engine control means for controlling the engine such that the actual driving torque is maintained below said limit drive torque.

2. A traction control system according to claim 1, wherein said slip state detecting means includes:
   drive wheel speed detecting means for detecting the speed of a drive wheel of said vehicle; and
   trailing wheel speed detecting means for detecting the speed of a trailing wheel of said vehicle.

3. A traction control system according to claim 2, wherein said slip state detecting means further includes a target drive wheel speed setting means for setting a target speed of said drive wheel in accordance with the speed of said trailing wheel.

4. A traction system according to claim 3, wherein said target drive wheel speed setting means includes first target drive wheel speed setting means which sets said target speed on the basis of the speed of said trailing wheel and a predetermined slip rate.

5. A traction system according to claim 3, wherein said target drive wheel speed setting means includes second target drive wheel speed setting means for setting a value obtained by adding a predetermined value to said trailing wheel speed as said target drive wheel target speed.

6. A traction control system according to claim 3, wherein said slip state detection means includes a decision means which decides that a slip of said drive wheel is taking place when said target drive wheel speed is exceeded by the detected drive wheel speed, and that no slip of said drive wheel is taking place when the detected drive wheel speed is below said target drive wheel speed.

7. A traction control system according to claim 1, wherein said limit drive torque updating means includes first target drive torque setting means for setting said limit drive torque such that said limit drive torque is decreased when a slip is taking place in said vehicle and said limit drive torque is increased when no slip is taking place therein.

8. A traction control system according to claim 7, wherein said limit drive torque updating means includes second target drive torque setting means capable of setting said limit drive torque in accordance with the deviation of a detected drive wheel speed from a target drive wheel speed.

9. A traction control system according to claim 1, wherein said limit throttle operation amount setting means includes:
   speed detecting means for detecting the speed of said engine;
   transmission ratio detecting means for detecting the transmission ratio of said motor vehicle; and conversion means for converting said limit drive torque into said limit throttle operation amount in accordance with said engine speed and said transmission ratio.

10. A traction control system according to claim 9, wherein said conversion means includes:
   limit engine torque setting means for setting a limit of the engine torque in accordance with said limit drive torque and said transmission ratio; and
   limit throttle operation amount setting means for setting said limit throttle operation amount in accordance with said engine speed and said limit engine torque.

11. A traction control system according to claim 1, wherein said limit drive torque updating means includes:
   initial value setting means capable of storing said limit drive torque even after turning off of said engine and setting the stored limit drive torque as the initial value when the traction control is commenced again.

12. A traction control system according to claim 1, wherein said limit drive torque updating means includes:
   running state detecting means for detecting the running state of said vehicle; and
   limit drive torque resetting means for resetting said limit drive torque to a previously stored value when said running state detection means has detected that said motor vehicle is not running.

13. A traction control system according to claim 12, wherein said limit drive torque resetting means includes memory means for storing, as said previously stored value, a limit drive torque assuming a compacted snowy road having a friction coefficient of 0.3 to 0.4.

14. A traction control system according to claim 1, further comprising an actuator for actuating the throttle valve of said engine.

15. A traction control system according to claim 14, wherein said engine control means includes:
   target throttle operation amount setting means for setting, as the target throttle operation amount, the smaller one of said limit throttle operation amount and said accelerator operation amount; and
   throttle opening control means for controlling said actuator such that the actual operation amount of said throttle valve coincides with said target throttle opening.

16. A traction control system according to claim 1, wherein said accelerator operation amount detecting means includes
   accelerator operation amount conversion means for converting the accelerator operation amount into a value corresponding to the throttle operation amount.

17. A traction control system comprising:
   slip state detecting means for detecting the state of wheel slip of a motor vehicle;
   limit drive torque updating means for successively updating the limit drive torque in accordance with the detected state of the slip;
   limit throttle valve operation amount setting means for setting the limit value of amount of operation of the throttle valve in accordance with said limit drive torque;
   instruction value detecting means for detecting the instruction value of operation amount of said throttle valve corresponding to the amount of operation of the accelerator by the driver;
   inhibiting means for preventing updating of said limit drive torque when the instruction value is smaller than said limit value; and
   engine control means for controlling said engine such that the drive torque of the motor vehicle is below the limit drive torque.

* * * * *